United States Patent [19]

Fujii et al.

[11] Patent Number: 4,755,435

[45] Date of Patent: Jul. 5, 1988

[54] PROCESS FOR COATING STEEL PANELS

[75] Inventors: Yasuhiro Fujii; Osamu Iwase; Hiroshi Oosumimoto; Shinji Sugiura; Ichiro Tabushi; Masafumi Kume; Takashi Udagawa; Komaharu Matsui, all of Hiratsuka, Japan

[73] Assignee: Kansai Paint Co., Ltd., Hyogo, Japan

[21] Appl. No.: 796,438

[22] Filed: Nov. 8, 1985

[30] Foreign Application Priority Data

| Nov. 12, 1984 | [JP] | Japan | 59-236742 |
| Nov. 13, 1984 | [JP] | Japan | 59-237679 |
| Nov. 13, 1984 | [JP] | Japan | 59-237680 |
| Nov. 14, 1984 | [JP] | Japan | 59-238546 |
| Nov. 16, 1984 | [JP] | Japan | 59-240588 |
| Nov. 19, 1984 | [JP] | Japan | 59-242387 |

[51] Int. Cl.$^4$ .................. B32B 15/08; C25D 13/00; B05D 3/02
[52] U.S. Cl. .................. 428/461; 204/181.3; 427/27; 427/195; 427/202; 427/407.1; 427/409
[58] Field of Search .......... 427/27, 195, 202, 407.2, 427/409; 428/461; 204/180.2, 181.1, 181.3, 14.1, 23, 29

[56] References Cited

U.S. PATENT DOCUMENTS

| 3,922,473 | 11/1975 | Kosaka et al. | 427/409 X |
| 3,998,716 | 12/1976 | Masar et al. | 204/180.1 |
| 4,139,672 | 2/1979 | Ozawa et al. | 427/202 X |
| 4,175,018 | 11/1979 | Gacesa | 204/181.1 |
| 4,259,163 | 3/1981 | Suzuki et al. | 204/181.1 |
| 4,312,902 | 1/1982 | Murase et al. | 427/386 |
| 4,358,508 | 11/1982 | Tanaka et al. | 427/195 X |
| 4,370,190 | 1/1983 | Ichinose et al. | 427/409 X |
| 4,481,239 | 11/1984 | Eckner | 428/36 |
| 4,508,767 | 4/1985 | Hokamura et al. | 427/407.1 |
| 4,529,632 | 7/1985 | Fujii et al. | 427/409 |

*Primary Examiner*—Thurman K. Page
*Attorney, Agent, or Firm*—Wenderoth, Lind & Ponack

[57] ABSTRACT

A process for coating a metallic substrate, characterized by applying on a metallic substrate a cation type electrocoating paint, applying thereon a barrier coat comprising a modified polyolefin resin and capable of forming a barrier coat film having a static glass transition temperature of 0° to −60° C., optionally applying on said barrier coat an intermediate coating paint and then applying thereon a top coating paint.

26 Claims, No Drawings

PROCESS FOR COATING STEEL PANELS

This invention relates to a process for coating a metallic substrate. More particularly, the present invention relates to a process for coating a metallic substrate such as, for example, a steel panel or the like constituting automotive bodies to form thereon a composite coating film excellent in chipping resistance, corrosion resistance, weather resistance and other physical properties.

Recently in the field of coating, there has come to be taken up more seriously the durability of the coating film on automotive outer bodies, particularly, the progress of corrosion of the metal materials of these outer bodies caused by the impact cracking of the coating film. For example, in the cold climatic areas of Europe and America, in order to prevent the surface freezing of roads for automobiles, there are often laid on the roads in winter pebbles mixed with a large quantity of rock salt ground to relatively coarse particles. In automobles running on such roads, the coating film on their outer portions is hit by the rock salt particles and pebbles flipped by the wheels and this impact often causes an impact cracking phenomenon, namely, so-called "chipping" in which the coating film locally peels off the body completely. Owing to this phenmenon, the metal surface of the outer body beneath the hit areas of the coating film is exposed to an atmosphere leading to rapid formation of rust and progress of corrosion. The cracking of coating film due to chipping ordinarily appears more in the bottom and underbody but it appears even in the hood of the roof. It is known that the resulting local corrosion progresses to a considerable degree in about 6 months to one year.

In order to prevent the chipping of coating film and the resulting progress of corrosion of the metal substrate beneath the coating film, there have heretofore been made various investigations on the chemical treatment, electrocoating primer, intermediate coating paint, and topcoating paint to be applied to the surface of metallic substrate of automotive outer body. For example, with respect to the chemical treatment, there was investigated the formation of an iron phosphate type film and a zinc phosphate type film each of different crystal form, but such a chemical treatment can not elevate the adhesivity of coating film to substrate metal to a level sufficiently resisting the impact of pebbles, etc. Also, with respect to the electrocoating paint and the top coating paint, various investigations were made on resins and/or pigments to be contained in these paints, but no electrocoating paint or top coating paint having an adhesivity sufficiently resisting the chipping has been developed yet.

There was also investigated the use of sericite or talc powder which is a foil-shaped inorganic pigment, in the composition of an intermediate coating paint. This method is intended to buffer and/or dissipating the impact applied to the coating film of automotive outer body, by a slipping action within the intermediate coating film due to the foil-shaped inorganic pigment, or to allow local peeling to occur only within the intermediate ocating film or only at the interface between the electrocoating film and the intermediate coating film, and consequently to prevent the electrocoating film from being damaged so that the electrocoating film can maintain a sufficient rust prevention function. However, this method has the following drawback. That is, since the impact applied to the outer surface of automotive body is various and is fairly large in some cases, when there is applied such an impact as can not be softened or dissipated by the slippage within the intermedaite coating film, the impact can not be completely absorbed by the intermediate coating film and spreads to all the coating film including the electrocoating film and, as a result, all the coating films at the portions which have received the impact peel off the metallic substrate, whereby rust develops quickly and corrosion progresses at these metallic substrate portions.

Hence, the present inventors made an extensive study in order to improve the above metnioned conventional drawbacks and to provide a process for coating a metallic substrate, particularly a steel panel to form thereon a multi-layered coating film excellent in chipping resistance, corrosion resistance, weather resistance and other physical properties and yet having a good film appearance as possessed by conventional coating systems for steel panels comprising an electrocoating paint, an intermediate coating paint which is optional, and a top coating paint. As a result, the present invenion has been completed.

According to the present invention, there is provided a process for coating a metallic substrate, characterized by applying on a metallic substrate a cation type electrocoating paint, applying thereon a barrier coat comprising a modified polyolefin resin and capable of forming a barrier coat film having a static glass transition temperature of 0° to $-60°$ C., optionally applying on said barrier coat an intermediate coating paint and then applying thereon a top coating paint.

An important characteristic of the present invention lies in that in a process for coating a metallic substrate, particularly a steel panel with a cation type electrocoating paint, an optional intermediate coating paint and a top coating paint in this order, a barrier coat having a particular composition and a particular property is applied on the electrocoating film formed, prior to the application of the optional intermediate coating paint or the top coating paint. Thanks to the application of this barrier coat, the formation of a composite coating film very excellent in chipping resistance, corrosion resistance, weather resistance and other physical properties has become possible.

The barrier coat film whose static glass transition temperature is adjusted to 0° to $-60°$ C. and whose elongation at break at $-20°$ C. is preferably adjusted to 100 to 1,000% is flexible as compared with conventional intermediate coating films, etc. used for improvement of chipping and has a viscoelasticity inherently possessed by the modified polyolefin. Hence, even if the surface of the top coating film formed on or above the barrier coat film having the above mentioned physical properties receives a strong impact of rock salt, pebbles, etc., the impact energy is mostly or completely absorbed within the barrier coat film and does not reach the electrocoating film beneath the barrier coat film and moreover even the top coating film and the optional intermediate coating film undergo little physical damage. That is, the barrier coat film has a buffer action for external impacts, whereby the chipping resistance of coating film system has been remarkably improved, development of rust and corrosion on steel panels caused by chipping has been prevented and the deterioration of the top coating film due to collision of rock salt, pebbles, etc. has been solved.

The coating process according to the present invention will be described in detail below.

Metallic substrate

This is a substrate material to be coated according to the present invention process. As the metallic substrate to which the present invention process is applicable, there can be used any materials having a metal suface to which cation electrocoating can be applied. Such materials include, for example, shaped articles made of iron, copper, aluminum, tin, zinc or an alloy thereof as well as products having a plated or deposited film of said metal or alloy. A steel panel is particularly preferred. Specifically, there are mentioned bodies and parts made of said materials, of passenger cars, trucks, safari cars, motor bicycles, etc. It is preferable that the surfaces of these metallic substrates be subjected to a chemical treatment with a phosphate, a chromate or the like prior to the application thereon of a cation type electrocoating paint.

Cation type electrocoating paint

This is an electrocoating paint to be applied on the surface of the above metallic substrate. Any cation type electrocating paints hitherto known, for example, those described in literatures such as "Kobunshi Kako", Vol. 25, No. 11, pages 5 to 10 (1976) can be used.

Cation type electrocating paints include thermosetting electrocoating paints of cathodic deposition type wherein a base resin having basic amino groups is neutralized with an acid and dissolved (or dispersed) in water. These paints are coated on a metallic substrate using the substrate as a cathode.

As the resin having basic amino groups, there are suitably used resins generally having a base value of about 20 to about 200 obtained by, for example, (1) addition of an amine to epoxy groups (oxirane rings) of an epoxy group-containing resin such as a bisphenol type epoxy resin, an epoxy group-containing (or glycidyl group-containing) acryl resin, a glycidyl ether of alkylene glycol, an epoxidized polybutadiene, an epoxidized novolak phenol resin or the like (2) polymerization using, as a monomer, an unsaturated compound having basic amino groups such as N,N-dimethylaminoethyl methacrylate, N,N-diethylaminoethyl acrylate, N-vinylpyrazole or the like, (3) reaction of a polyisocyanate compound with a glycol containing, as one component, a tertiary amino group-containing glycol (e.g. N-methyldiethanolamine) and (4) introduction of amino groups to a resin by an imidoamine formation reaction between an acid anhydride and a diamine.

As the amine used in the above reaction (1), there can be mentioned primary amines, secondary amines and tertiary amine salts of aliphatic type, alicyclic type and araliphatic type. Products obtained by adding to the epoxy group-containing resin mentioned in (1), a secondary sulfide salt or a tertiary phsophine salt in place of said amine can also be used in the present invention as a vehicle component of the cation type electrocoating paint.

As the neutralizing agent to neutralize the resin having basic amino groups to dissolve (or disperse) the resin in water, there can be used, for example, organic acids such as acetic acid, hydroxyacetic acid, propionic acid, butyric acid, lactic acid, glycine and the like as well as inorganic acids such as sulfuric acid, hydrochloric acid, phosphoric acid and the like. The appropriate amount of the neutralizing agent to the resin is about 0.1 to about 0.4 time the neutralization equivalent for the base value of the resin (generally about 20 to about 200).

As the crosslinking agent incorporated into the cation type electrocoating paint to make it thermosetting there is generally used a blocked polyisocyanate compound. When the electrocoating paint is coated on a substrate and heated (ordinarily to 140° C. or a higher temperature), the crosslinking agent causes dissociation, whereby the isocyanate groups are regenerated and cause a crosslinking reaction with active hydrogen-containing functional groups (e.g. hydroxyl group) presnet in the resin having basic amino groups. Thus, the electrocoating paint coated becomes a cured film.

Into the cation type electrocoating paint usable in the present invention are further incorporated, if necessary, pigments, hydrophilic organic solvents (e.g. isopropanol, n-butanol, ethoxyethanol, diethylene glycol monomethyl ether, diethylene glycol monoethyl ether, diethylene glycol monobutyl ether) and ordinarily used additives. The resulting mixture is adjusted with a deionized water so as to have a solid content of about 5 to about 40% by weight and its pH is kept at 5.5 to 8.0.

The cation type electrocoating paint thus prepared is subjected to cation electrocoating. It is usually conducted under conditions of 15° to 135° C. (bath temperature) and 100 to 400 V (load voltage) using a metallic substrate as a cathode. The electrocoating film thickness is not particularly restricted and can vary largely depending upn the application of finished product, etc. However, the thickness is preferred to be generally 10 to 40 $\mu$, particularly 15 to 40 $\mu$ in terms of cured film thickness of flat portions. The baking and curing temperature of the coating film is suitably 100° to 210° C. generally.

In the preparation of the cation type electrocoating paint, pigments have generally been used, in order not to reduce the smoothness of coating film, in an amount less than 40 parts by weight, ordinarily 35 parts by weight or less based on 100 parts by weight of resin solid. In the present invention, too, pigments can be used in the cation type electrocoating paint in the above amount. However, it was found in the present invention that use of pigments in the electrocoating paint in an amount of 40 parts by weight or more based on 100 parts by weight of resin solid can give a final coated product whose metallic substrate (especially its acute-angled portions) is further improved in corrosion resistance and chipping resistance.

Metallic substrate, for example, automotive bodies contain many acute-angled portions of steel panel such as side, bottom and back of facia, fender, door panel, panel hood, panel roof, panel trunk lid and body. Unlike other flat portions, these acute-angled portions have an acute-angled or projected shape. At such portions, paints do not ahdere sufficiently and, once adhered, melt-flow during heat curing. Therefore, it has been inevitable that the film thickness gets thinner at the acute-angled portions as compared with that of flat portions and, especially at very acute-angled portions, the film thickness becomes extremely thin. As a result, the acute-angled portions have far inferior corrosion resistance than the flat portions and rust tends to easily appear firstly in the acute-angled portions. In contrast, when the present invention process is carried out using a cation type electrocoating paint containing a high concentration of pigments, the electrocoating paint adheres sufficiently even to the acute-angled portions and fine uneven portions present on the surface of the electrocoating film are filled by a barrier coat (to be described later), whereby the penetration of an intermediate coating paint or a top coating paint can be prevented and a coating system having improved surface smoothness, distinctness of image gross, corrosion resistance of acute-angled portions, etc. can be obtained.

The amount of pigment incorporated in the cation type electrocoating paint in order to obtain such a coating system is more than in normal cases and specifically is 40 to 150 parts by weight, preferably 55 to 100 parts by weight, more preferably 60 to 85 parts by weight based on 100 parts by weight of resin solid. Needless to say, there can also be used in the present invention in an amount less than 40 parts by weight, ordinarily 35 parts by weight or less based on 100 parts by weight of resin solid which hitherto has been used generally. The pigments usable in the cation type electrocoating paint are not particularly restricted in type and include color pigments, extender pigments, rust preventive pigments, etc. which are all known. As such pigments, there can be mentioned, for example, zinc oxide, antimony white, basic lead sulfate, basic lead carbonate, titanium dioxide, lithopone, lead silicate, zirconium oxide, carbon black, graphite, black iron oxide, aniline black, cuprous oxide, cadmium red, chrome vermilion, red iron oxide, pigment red, pigment violet, pigment orange, basic lead chromate, chrome yellow, ocher, cadmium yellow, strontium chromate, titanium yellow, litharge, pigment yellow, pigment green, zinc green, chrome green, chromium oxide, Phthalocyanine Green, ultramarine, prussian blue, Phthalocyanine Blue, pigment blue, cobalt violet, pigment violet, zinc powder, zinc oxide, red lead, lead cyanide, calcium plumbate, zinc yellow, silicon carbide, aluminum powder, asbestine, alumina, clay, diatomaceous earth, slaked lime, gypsum, talc, barium carbonate, precipitated calcium carbonate, calcium carbonate, precipitated barium sulfate, barite, bentonite, white carbon, glass beads, etc. These pigments can be used alone or in a combination of two or more.

Barrier coat

This is a composition to be applied on the surface of the cation type electrocoating paint already applied. It is a coating composition composed mainly of a modified polyolefin resin and capble of forming a barrier coat film having a static glass transition temperature of 0° to −60° C., preferably −30° to −60° C., more preferably −40° to −55° C. The above "modified polyolefin resin" refers to a resin which is composed mainly of a polyolefin resin and wherein the resin is modified by a chemical reaction or is mixed with a modifying agent. The base polyolefin to be modified includes a homopolymer or copolymer of at least one member selected from ethylenic hydrocarbons represented by the general formula $C_nH_{2n}$ (n=2 to 10 such as ethylene, propylene, butene, pentene, heptene, octene and the like. The base polyolefin resin preferably has a number average molecular weight of 10,000 to 1,000,000, particularly 100,000 to 800,000.

At the modified polyolefin resin obtained by modifying a base polyolefin by a chemical reaction, there are, for example, the following resins.

(A-1) Resins obtained by graft-polymerizing maleic acid or maleic anhydride onto a base polyolefin resin. Particularly preferable among these is a resin obtained by graft-polymerizing 0.1 to 50 parts by weight, preferably 0.3 to 20 parts by weight of maleic acid or maleic anhydride onto 100 parts by weight of a propylene-ethylene copolymer (the mole ratio of propylene:ethylene is ordinarily 40:60 to 80:20, preferably 50:50 to 70:30).

(A-2) Resins obtained by graft-polymerizing acrylic acid or methacrylic acid onto the chlorinated product of a base polyolefin resin [e.g. a chlorinated polyolefin described in (B-1) which appears later]. Preferably, the amount of acrylic acid or methacrylic acid used is generally 0.1 to 50 parts by weight, preferably 1 to 30 parts by weight based on 100 parts by weight of chlorinated polyolefin resin.

(A-3) Copolymers between (a) at least one member selected from the aforementioned ethylenic hydrocarbons and (b) at least one comonomer selected from vinyl acetate, acrylic acid and methacrylic acid. In these copolymers, the ratio of the two components is preferred to be such that the former component is 99 to 30% and the latter component is 1 to 70% based on the total weight of the two components. The appropriate number average molecular weight of these copolymers is 10,000 to 800,000.

As the modified polyolefin resin obtained by adding to a base polyolefin resin another component (a modifying agent), there are, for example, the following resins.

(B-1) Compositions obtained by adding to 100 parts by weight of a base polyolefin [preferably the same propyleneethylene copolymer as mentioned in (A-1)], 1 to 90 parts by weight, preferably 1 to 60 parts by weight, more preferably 10 to 40 parts by weight of a chlorinated polyolefin (preferably a chlorinated polypropylene) having a chlorination degree generally of about 1 to 60%, preferably 20 to 40% and a number average molecular weight ordinarily of 10,000 to 1,000,000, particularly 100.000 to 500,000.

(B-2) Compositions obtained by adding to a base polyolefin resin an acrylic resin having a static glass transition temperature of 0° C. or lower, preferably −10° C. or lower and a number average molecular weight of 5,000 to 100,000, in the same proportion as in (B-1).

(B-3) Compositions obtained by adding to 100 parts by weight of a base polyolefin resin, 1 to 90 parts by weight, preferably 1 to 60 parts by weight, more preferably 10 to 40 parts by weight of a styrene-butadiene copolymer preferably having a styrene:butadiene weight ratio of 1:99 to 50:50.

Of the above modified polyolefin resins, (A-1) and (B-1) are particularly preferred.

These modified polyolefin resins are preferred to have by themselves a static glass transition temperature of 0° to −60° C.; however, this is not essential. What is essential is that a coating film formed by the barrier coat has the above static glass transition temperature. Accordingly, even if a modified polyolefin resin used does not have the above static glass transition temperature by itself, the resin can provide a barrier coat capable of forming a coating film having a static glass transition temperature of 0° to −60° C., by using the resin in combination with a modifier for static glass transition temperature. Such a modifier for static glass transition temperature include thickeners. As thickeners usable in the present invention process, there can be mentioned those having a good compatibility with a modifiled polyolefin resin used, such as, for example, a rosin, a rosin ester, a hydrogenated rosin, a polyterpene resin, an ester gum, an epoxy-modified polybutadiene, an aliphatic epoxy resin of low molecular weight, an aliphatic bisphenol type epoxy resin of low molecular weight, a polyoxytetramethylene glycol, a silicone rubber, a polyvinyl ethyl ether and a polyvinyl methyl ether, These thickeners preferably have a static glass transition temperature generally of +20° C. to −70° C. These thickeners can be added even to a modified polyolefin resin having a static glass transition temperature of 0° to −60° C. In this case, the coating film of the barrier coat obtained has a more desirable static glass transition temperature. The amount of the thickener used differs by the type thereof, the type of modified polyolefin resin used, the required physical properties of coating film formed, etc. and can not be strictly specified. However, the amount is generally 1 to 50 parts by weight, preferably 5 to 30 parts by weight based on 100 parts by weight of modified polyolefin resin.

The coating film formed by the barrier coat according to the present invention has a static glass transition temperature of 0° to −60° C., preferably −30° to −60° C., more preferably −40° to −55° C. In addition, the coating film desirably has an elongation at break ordinarily of 200 to 1,000%, preferably 300 to 800%, more preferably 400 to 800% in an atmosphere of −20° C.

"Static glass transition temperature" and "elongation at break" used in the present specification and the appended claims refer to the values obtained from the following measurement methods.

Test sample

A barrier coat was applied on a tin plate so that the final film thickness became 25 μ. Baking was conducted for 30 min. at 120° C., after which the coating film was isolated using an amalgam process. This film isolated was used as a test sample.

Measurement methods

For the above test sample, static glass transition temperature wa measured using a differential scanning calorimeter (DSC-10 type manufactured by Daini Seikosha). For the same test sample, elongation at break was measured at −20° C. using a universal tensile tester with constant temperature bath (Autograph S-D type manufactured by Shimadzu Corp.). In this measurement, the sample length was 20 mm and the tensile speed was 20 mm/min.

The modified polyolefin resin and if necessary, the thickeners are selected so as to give a barrier coat film having desired physical properties as mentioned previously.

The barrier coat composed mainly of a modified polyolefin resin can be prepared in a form of organic solvent type paint or aqueous type paint. The form of organic solvent type paint is preferable. Such a barrier coat of organic solvent type can be prepared by dissolving or dispersing modified polyolefin and if necessary a modifier for static glass transition temperature in an organic solvent. As the organic solvent, there can be mentioned aromatic hydrocarbons such as benzene, toluene, xylene and the like; aliphatic hydrocarbons such as hexane, heptane, octane, decane and the like; chlorinated hydrocarbons such as trichloroethylene, perchloroethylene, dichloroethylene, dichloroethane, dichlorobenzene and the like.

When a top coating paint is directly applied on the barrier coat film (an intermediate coating paint is not applied), it is preferable that the barrier coat contains, in addition to the above mentioned organic solvent, another organic solvent having a boiling point of 150° C. or higher and compatible with a top coating paint powder (hereinunder this organic solvent is referred at times to as "compatible solvent"), such as diisopropylbenzene, tetralin, decalin, o-dichlorobenzene, trichlorobenzene, benzyl alcohol, diisobutyl ketone, isophorone, cellosolve acetate, carbitol acetate, dimethyl phthalate or the like. Use of such a compatible solvent in combination with an organic solvent as mentioned above is preferable for the following reason. That is, when a barrier coat obtained by dissolving or dispersing a modified polyolefin resin in a mixed solvent consisting of an organic solvent and a compatible solvent is applied and subsequently a top coating paint powder is applied on the still wet (not baked) barrier coat film and baked, the compatible solvent remaining in the barrier coat film evaporates and reaches the top coating powder film, whereby the resin powder has an improved melt-flow characteristics and the smoothness of finished coating surface is remarkably improved. The amount of compatible solvent in mixed solvent has no particular restriction but is preferably 5 to 50% by weight. The content of mixed solvent in barrier coat is appropriately 15 to 95% by weight. Thus, when a top coating paint powder is directly applied on a barrier coat film and an intermediate coating paint is not applied, by applying a top coating paint powder on a barrier coat film which is still wet and contains a compatible solvent, there can be effectively produced a finished coating surface having improved smoothness.

Into the barrier coat can be incorporated various additives if necessary. For example, there can be incorporated pigments mentioned with respect to the cation type electrocoating paint, such as color pigments, extender pigments and the like (rust preventive pigments are excluded). The amount of pigments incorporated can be generally 150 parts by weight or less, preferably 100 parts by weight or less based on 100 parts by weight of modified polyolefin resin.

Into the barrier coat can further be incorporated, for purposes of, for example, (1) improvement of physical properties of coating film, (2) improvement of dispersibility of pigments and (3) filling, proper amounts of known additives for coatings such as, for example, a rosin, a rosin ester, a hydrogenated rosin, a polyterpene resin, an ester gum, an epoxy-modified polybutadiene, an aliphatic epoxy resin of low molecular weight, an aliphatic bisphenol type epoxy resin of low molecular weight, a polyoxytetramethylene glycol, a silicone rubber, a polyvinyl ethyl ether, a polyvinyl methyl ether, a pigment dispersing agent, a film surface improver and the like.

When an intermediate coating paint is omitted and a top coating paint is directly applied on the barrier coat film, it is preferable that the barrier coat further contains deterioration inhibitors for resins such as an ultraviolet absorber, a phtostabilizer, an anti-oxidant and the like. The purpose of using such inhibitors is to absorb an ultraviolet rays pasing through a top coating film having a small hiding power and to prevent the oxidation of radicals generated in resin chains and thereby to protect the barrier coat film and even the electrocoating film suface from being deteriorated with time by the ultraviolet ray.

The ultraviolet absorber usable in the barrier coat can be any as long as it can absorb the energy of ultraviolet ray, is compatible with or uniformly dispersible in the modified polyolefin resin used in the barrier coat and does not easily decompose and lose its function at a temperature at which the barrier coat film or a whole coating system is baked. The usable ultraviolet absorber includes, for example, benzophenones such as benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4-methoxybenzophenone, 2-hydroxy-4-octoxybenzophenone 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone, 2-hydroxy-4-(2-hydroxy-3-methylacryloxy)propoxybenzophenone and the like; benzotriazoles such as 2-(2'-hydroxy-5'-methylphenyl)benzotriazole, 2-(2-hydroxy-3,5-di(1,1-dimethylbenzylphenyl)-2H-benzotriazole, 2-(2'-hydroxy-3',5'-ditertiary-butylphenyl)benzotriazole, 2-(2'-hydroxy-3'-tertiary-butyl-5'-methylphenyl)benzotriazole, 2-(3,5-ditertiary-amyl-2-hydroxyphenyl)benzotraizole, 2-(2'-hydroxy-3',5'-ditertiarybutylphenyl)5-chlorobenzotriazole, 2-(2'-hydroxy-3,',5'-ditertiaryisoamylphenyl)benzotriazole, 2-(hydroxy-5-tertiary-butylphenyl)benzotriazole and the like; salicylic acid ester such as phenyl salicylate, 4-tertiary-butylphenyl salicylate, p-octylphenyl salicylate and the like; diphenyl acrylates such as ethyl-2-cyano-3,3'-diphenyl acrylate, 2-ethylhexyl-2-cyano-3,3'-diphenyl acrylate and the like; hydroxy-5-methoxyacetophenone; 2-hydroxynaphthophenone; 2-ethoxyethyl-p-methoxycinnamate; nickel bisoctylphenylsulfide; [2,2'-thiobis(4-t-octylphenolate]-n-butylamine-nickel; oxalic acid anilide; etc. There are commercially available ulitraviolet absorbers. As commercial products of benzotriazole type, there are mentioned, for example, Tinuvin 900 and Tinuvin 328, both of CIBA-Geigy Co. As products of benzophenone type, there is mentioned, for exasmple, Uninul 400 (a product of BASF). As products of oxalic acid anilide type, there is mentioned, for example, Sanduvor 3206 of SANDOZ Ltd.

The amount of ultraviolet absorber used is preferably 0.1 to 10 parts by weight, more preferably 0.5 to 5 parts by weight based on 100 parts by weight of modified polyolefin resin.

As the photostabilizer, there are mentioned, for example, tetrakis(2,2,6,6-tetramethyl-4-piperidyl) 1,2,3,4-butanetetracarboxylate, 8-acetyl-3-dodecyl-7,7,9,9-tetramethyl-1,3,8-triazaspiro(4,5)decane-2,4-dione, bis(1,2,2,6,6-entamethyl-4-piperidinyl) sebacate, bis(2,2,6,6-tetramethyl-4-piperidyl)sebacate, bis(1,2,2,6,6-pentamethyl-4-piperidyl) sebacate, dimethyl-2-(4-hydroxy-2,2,6,6-tetramethyl-1piperidyl) ethanol condensate, poly[6-(1,1,3,3-tetramethyl-butyl)imino-1,3,5-triazine-2,4-diyl-4-(2,2,6,6-tetramethyl-piperidyl)-hexamethylene-4,4-(2,2,6,6-tetramethylpiperidyl-)imino], 1-[2,3-(3,5-di-t-butyl-4-hydroxyphenyl)propionyloxyethyl]-3,4-(3,5-di-t-butyl-4-hydroxyphenyl)-propionyloxy]-2,2,6,6-tetramethylpiperidine, etc. As the anti-oxidant, there are mentioned, for example, 4,4'-thiobis-(3-methyl-6-t-butylphenyl), 2,2'-methylenebis-(4-methyl-6-t-butylphenol), 4,4'-methylenebis-(2,6-di-t-butylphenol), 1,3,5-trimethyl-2,4,6-tris(3,5-di-t-butyl-4-hydroxybenzyl)benzene, tris(2-methyl-4-hydroxy-5-t-butylphenyl)butane, pentaerythritol tetrakis(3-laurylthiopropionate), dilaurylthio dipropionate, distearylthio dipropionate, dimyristylthio dipropionate, triethylene glycol bis-3-(3-t-butyl-5-methyl-4-hydroxyphenyl)propionate, 1,6-hexanediol bis-3-(3,5-di-t-butyl-4-hydroxyphenyl)propionate, 2,4-bis(n-octylthio)-6-(4-hydroxy-3,5-di-t-butylanilino)-1,3,5-triazine, pentaerythritol tetrakis-[3-(3,5-di-t-butyl-4-hydroxyphenyl)propionate], 2,2-thiodiethylene-bis[3-(3,5-di-t-butyl-4-hydroxyphenyl)-propionate], octadecyl-3-(3,5-di-t-butyl-4-hydroxyphenyl)-propionate, 2,2-thiobis(4-methyl-6-t-butylphenol), N,N'-hexamethylenebis-(3,5-di-t-butyl-4-hydroxy-hydroxycinnamamide), etc. The photostabilizer and/or the anti-oxidant is used preferably in combination with the ultraviolet absorber. The appropriate amount of photostabilizer used is 0.1 to 10 parts by weight, preferably 0.5 to 3 parts by weight, based on 100 parts by weight of modified polyolefin resin. The appropriate amount of anti-oxidant used is 0.1 to 5 parts by weight, preferably 0.2 to 3 parts by weight on the same basis.

The application of the barrier coat on the electrocoating film already formed according to the method mentioned above can be conducted according to any known method such as spray coating, brush coating, dip coating, melt coating, electrostatic coating or the like. The film thickness of the barrier coat is preferred to be ordinarily 1 to 20µ, particularly 2 to 10µ in terms of thickness of dried film.

As mentioned previously, in the present invention process, on the surface of the barrier coat film formed is then coated an intermediate coating paint or a top coating paint. Prior to this coating, the barrier coat film can be baked. The prior baking is generally preferable but is not essential. Depending upon the type of paint to be applied on the barrier coat film, for example, when a top coating paint powder is directly applied on the barrier coat film, baking of the barrier coat film is not required and wet-on-wet application of an intermediate coating paint or a top coating paint is possible. There are cases that this wet-on-wet application is preferable.

The appropriate baking temperature is genrally 80° to 160° C., particularly 80° to 130° C.

Intermediate coating paint

Onto the surface of the barrier coat film can be applied an intermediate coating paint, prior to the application of a top coating paint. The main purpose of conducting this intermediate coating is to allow a final coating film to have a high quality excellent in durability, surface smoothness and sharpness, adhesion, etc. Therefore, when the final coating film is not required to have such a high quality, the intermediate coating can be omitted. However, in the preferred embodiments of the present invention process, the application of an intermediate coating paint is generally preferable.

As the intermediate coating paint optionally usable in the present invention process, there can be used any known intermediate coating paint which has been used in conventional coating systems consisting of a primer, an intermediate coating paint and a top coating paint and is excellent in adhesion, distinctness of image gloss (surface smoothness), surface sharpness, overbaking resistance, weather resistance. etc. Specifically, there can be mentioned thermosetting intermediate coating paints using, as a vehicle main component, a combination of (1) a short or ultra-short oil alkyd resin having an oil length of 30% or less and/or an oil-free polyester resin and (2) an amino resin. The alkyd resin and and the polyester resin desirably have a hydroxyl value ordinarily of 60 to 140, particularly 80 to 120 and an acid value of 5 to 100.

As the particularly preferable alkyd resins and polyester resins, there can be mentioned resins obtained from esterification between a polyhydric alcohol (e.g. ethylene glycol, propylene glycol, butylene glycol, hexanediol, neopentyl glycol, glycerine, trimethylolethane, trimethylolpropane, pentaerythirotol) and a polybasic acid (e.g. phthalic acid, maleic acid, terephthalic acid, adipic acid, tetrahydroxyphthalic acid, fumaric acid, itaconic acid, pyromellitic acid, their anhydrides).

As the oil usable for modification of the alkyd resin, there can be mentioned, for example, drying oils or semi-drying oils such as linseed oil, soybean oil, safflower oil, tung oil, tall oil, dehydrated castor oil and the like, as well as unsaturated fatty acids obtained from said oils.

As the amino resin used in combination with the oil-modified alkyd resin or the oil-free polyester resin, generally there are suitably used melamine resins etherified with an alkyl group of 1 to 5 carbon atoms, urea resins, benzoguanamine resins, etc. With respect to the amount ratio of the amino resin to other resins, it is desirable that the oil-modified alkyd resin and/or the oil-free polyester resin is 65 to 85%, preferably 70 to 80% in terms of solid weight and the amino resin is 35 to 15%, preferably 30 to 20%. At least part of the amino resin can be replaced by a polyisocyanate compound or a blocked polyisocyanate. As the blocked or non-blocked polyisocyanate compound, there can be mentioned, for example, tolylene diisocyanate, diphenyl methane diisocyanate, xylylene diisocyanate, hexamethylene diisocyanate, isophorone diisocyanate, a reaction product between 1 mole of trimethylolpropane and 3 moles of tolylene diisocyanate or hexamethylene diisocyanate.

The intermediate coating paint using the above resins a vehicle components preferably has a form of organic solvent type or aqueous type (aqueous solution or aqueous dispersion). The organic solvent type is most preferable. The intermediate coating paint may also have a form of non-aqueous dispersion type, high solid type, powder type or the like. It is preferable that the intermediate coating paint give a coating film having a pencil hardness generally of 3B to 6H, preferably B to 2H at 20° C. The intermediate coating paint can further contain, if necessary, extender pigments, color pigments and other additives ordinarily used for coatings, in amounts ordinarily used.

The application of the intermediate coating paint on the barrier coat film can be conducted, as in the application of the barrier coat, using a method such as spray coating, brush coating, dip coating, melt coating, electrostatic coating or the like. It is preferable that the intermediate coating film have a thickness generally of 10 to 100μ, preferably 15 to 50μ. The curing of the intermediate coating film can be conducted at any temperature suitable for the curing characteristic of the film as long as the temperature causes no substantial thermal deterioration of the film. However, when thermal curing is applied, the curing temperature is preferably 80° to 170° C., more preferably 120° to 150° C.

Top coating paint

This is a paint to be applied on the surface of the barrier coat film or of the intermediate coating film in order to give the coated bodies pleasuant appearance. As this top coating paint, there can be used top coating paints used in conventional coating systems consisting of a primer, an intermediate coating paint and a top coating paint. As such top coating paint, there can generally be used conventionally known paints capable of forming a coating film excellent in surface appearance (e.g. sharpness, smoothness, gloss), weather resistance (e.g. gloss retention, color retention, chalking resistance), chemical resistance, moisture resistance, water-resistance, curability, etc. As the top coating paint usable in the present invention process, there can be mentioned, for example, paints preferably of organic solvent type or aqueous type, using as the main vehicle component a resin such as an amino-acryl resin type, an acid-glycidyl-acryl resin type, an isocyanate-acryl resin type, an amino-alkyd resin system, an amino-polyester resin type, an isocyanate-polyester resin type or the like.

Preferable examples of the top coating paint include an amino acryl resin type paint, namely, a thermosetting paint using an amino resin as a crosslinking agent. This paint uses, as main components, (a) an acryl resin obtained by polymerizing an appropriate combination of a hard monomer (e.g. methyl methacrylate, ethyl methacrylate, n-butyl methacrylate, isobutyl methacrylate), a soft monomer (e.g. n-hexyl methacrylate, lauryl methacrylate, methyl acrylate, ethyl acrylate, n-butyl acrylate, 2-ethylhexyl acrylate), a functional group-containing monomer (e.g. acrylic acid, methacrylic acid, hydroxyethyl methacrylate, hydroxyethyl acrylate, acrylamide, glycidyl acrylate) and other monomer (e.g. styrene, acrylonitrile) and (b) an amino resin selected from resins such as a melamine resin etherified with an alkyl group of 1 to 5 carbon atoms and an urea resin etherified with an alkyl group of 1 to 5 carbon atoms. Said acryl resin (a) preferably has a number average molecular weight of 5,000 to 50,000, a hydroxyl value of 5 to 40 and an acid value of 2 to 100. Another preferable example of the top coating paint is an amino alkyd resin type paint, wherein a butylated melamine resin is preferable as the amino resin component and an alkyd resin modified with a semi-drying oil or an ultra-short oil alkyd resin is preferable as the alkyd resin component.

When the top coating paint is particularly a paint capable of forming an ultra-hard film, the composite coating film formed in accordance with the present invention process has a remarkably improved scuff resistance and is hard and flexible. This composite coating film, since its uppermost layer is an ultra-hard film and accordingly is hard, can almost completely prevent the formation of scuffs caused by a car washing brush, a polishing compound, dust, etc. and possesses improved weather resistance. Further, the composite coating film, since it also contains barrier coat film having physical properties as mentioned previously beneath or below the uppermost layer, even if it receives a strong impact force by collision of rock salt, pebbles, etc. at the outermost ultra-hard film, can absorb completely or almost completely the impact energy within the barrier coat film; thereby, the impact energy does not reach the electrocoating film beneath the barrier coating film and yet the top coating film (and the intermediate coating film) receive little physical damage. That is, the barrier coat film functions as a buffer zone for impacts applied from outside, whereby the mutli-layered coating film has remarkably improved chipping resistance, the metallic substrate such as a steel panel can be protected from development of rust and corrison caused by chipping, and the top coating film can be free from damage by collision of rock salt, pebbles, etc. Thus, the multi-layered coating film is hard and flexible and accordingly exhibits excellent performances as mentioned above.

"Ultra-hard film" said herein is a coating film having a hardness (as cured) of 4H to 9H at 20° C. when measured in accordance with a pencil hardness testing method.

The pencil hardness testing method used in the present invention is such that a glass plate is coated with a paint to be tested according to the present invention process, the resulting composite coating film is cured, the resulting test plate is kept at 20° C., a pencil ("Uni" for drawing use, manufactured by Mitsubishi Pencil Ltd.) whose lead tip has been ground flatly so as to have a sharp edge is strongly pressed onto the coated surface of the test plate at an angle of 45° at such a pressure as the pencil lead is not broke, in this condition the pencil is moved by about 1 cm at a speed of 3 sec/cm, and in this way there is measured the hardness of the harest pencil causing no scratch.

As the top coating paint capable of forming an ultra-hard film, there can be mentined, for example, cross-linking-curable paints using, as a vehicle component, a resin such as an amino-acryl resin type, an amino-alkyd resin type, an amino-polyester resin type, an amino-fluorine resin type, an amino-silicone-polyester resin type, an unsaturated polyester resin type, an isocyanate-acryl resin-type, an isocyanate-polyester resin type, an isocyanate-fluorine resin type, an unsaturated acryl resin type or the like. Preferable of these are top coating paints of amino-alkyd resin type, amino-acryl resin type, and amino-silicon-polyester resin type.

As the method for forming an ultra-hard film, there can be mentioned, for example, (1) when the vehicle component is a polyester resin- or an alkyd resin-based, a method wherein the polybasic acid component of said resin is a hard, aromatic type polybasic acid such as phthalic acid, isophthalic acid, terephthalic acid, trimellitic acid, their anhydrides or the like, (2) when the vehicle component is an acryl resin-based, a method wherein said resin is a hard, acrylic type resin using a monomer giving a high glass transition temperature and (3) a method wherein the vehicle component is a resin having a relatively large molecular weight and containing within the molecule a large proportion of crosslinkable functional groups and the amount and type of catalyst (internal or external catalyst) and/or the amount and type of crosslinking agent (or curing agent) are controlled.

The form of the top coating paint used in the present invention process has no particular restriction and can be of organic solution type, non-aqueous dispersion type, aqueous solution type, aqueous dispersion type, poder type, high solid type, etc.

The top coating paint used in the present invention process is classified into (1) an enamel paint obtained by adding, to a paint using the above mentioned main vehicle component, metallic pigments and/or color pigments and (2) a clear paint completely or substantially free from these pigments. Using such a paint, a top coating film can be formed thermally according to, for example, the following methods.

(1) A metallic paint containing metallic pigments and, as necessary, color pigments or a solid color paint containing color pigments is applied and heat-cured. (Metallic or solid color finishing by one coating and one baking)

(2) A metallic paint or a solid color paint is applied and heat-cured. Then, a clear paint is applied and again heat-cured. (Metallic or solid color finishing by two coatings and two bakings)

(3) A metallic paint or a solid color paint is applied and then a clear paint is applied. Subsequently, the resulting two films are cured simultaneously. (Metallic or solid color finishing by two coatings and one baking)

The top coating paints mentioned above are applied preferably by spray coating, electrostatic coating, etc. The resuting coating film is dried and/or cured by room temperature drying, heat drying, heat curing, crosslinking curing by irradiation of active energy rays (e.g. electron rays, ultraviolet rays), etc., depending upon the form, type, etc. of paint applied.

The top coating film formed a above preferably has a thickness (as dried) of 25 to 40μ when the method (1) is used and 10 to 30μ (metallic and solid color paints) and 25 to 50μ (clear paint) when the method (2) or (3) is used. The heating condition of the top coating film can vary depending upn the type of vehicle component used. However, preferably it is generally 80° to 170° C., particularly 120° to 150° C. and 10 to 40 min.

When a top coating paint of powder type is mainly used as the top coating paint, there can be used, for example, the following coating and baking methods.

(a) An enamel solid color paint of powder form obtained by adding color pigments to the vehicle component of the above mentioned powder paint is applied on the barrier coat film and baked. (Solid color finishing by one coating and one baking)

(b) A solid color or metallic paint of liquid form is applied on the barrier coat film. Then, after or without baking, the above mentioned clear paint of powder form substantially or completely free from color pigments is applied and baking is conducted. (A solid color or metallic finishing by two coatings and one baking or by two coatings or two bakings)

In the method (a), after the barrier coat film has been baked, preferably a barrier coat containing a compatible solvent is applied. Thereon, without baking, is applied a solid color enamel pain of powder form so that this application can give a film having a thickness (after baking) of about 30 to 150μ. The resulting film is baked at 120° to 210° C., particularly 130° to 180° C. By allowing the barrier coat film to contain a compatible solvent, the development of fine unevenness (as seen on orange skins) on the surface of the top coating film can be prevented and the top coating film can have an appearance of excellent smoothness.

In the method (b), a barrier coat is applied and, after or without baking, a solid color or metallic paint of liquid form is applied thereon so that the latter application can give a film having a thickness (after baking) of 10 to 30μ. Then, after baking at, for example, 80° to 170° C. or without baking, the above mentioned clear paint of powder form is applied so as to give a film having a thickness (after baking) of 30 to 150 and baking is conducted at 80° to 170° C., particularly 120° to 160° C.

The top coating film formed can have a pencil hardness generally of 2B to 9H a 20° C., depending upon factors such as the type of vehicle component contained in the film.

The coating film formed as above according to the present invention process is excellent in surface appearance (e.g. smoothness, gloss, sharpness), water resistance, weather resistance, etc. and is remarkably improved particularly in chipping resistance and other physical (mechanical) properties. Accordingly, it is suitable for use particularly in automotive bodies.

The present invention will be more specifically described hereinbelow, with reference to Examples and Comparative Examples.

I. Samples (1) Metallic substrates (A) A steel panel treated with a surface treating agent of zinc phosphate type (dimensions: 30 mm×90 mm×0.8 mm).

(B) A steel panel having an acute-angled portion obtained by bending the steel panel (A) by 90°.

(2) Cation type electrocoating paints (A) A paint using, as vehicle components, a polyamide-modified bisphenol type epoxy resin (acetic acid used as a neutralizing agent) and a blocked polyisocyanate compound. pH: 6.5 Solid content: 20% by weight.

(B) A paint comprising 100 parts by weight of the vehicle components of the paint (A) and 61.5 parts by weight of pigments consisting of 30 parts by weight of titanium dioxide, 1.5 parts by weight of carbon black and 30 parts by weight of clay. pH: 6.5 Solid content: 20% by weight. The coating film obtained by this paint alone was not satisfactory in smoothness.

(C) A paint comprising 100 parts by weight of the vehicle components of the paint (A) and 79 parts by weight of the pigment of the paint (B). pH: 6.5 Solid content: 20% by weight. The coating film obtained by this paint alone was inferior in smoothness.

(3) Barrier coats (A) A toluene solution of a resin obtained by graft-polymerizing a propylene-ethylene copolymer with maleic acid. Static glass transition temperature: −43° C. Elongation at break at −20° C.: 410%.

(B) A toluene solution of a resin obtained by blending 100 parts by weight of the resin (A) and 10 parts by weight of a rosin. Static glass transition temperature: −52° C. Elongation at break at −20° C. 710%.

(C) A toluene solution containing the graft polymer of the barrier coat (A), 1-[2-hydroxy-3,5-di(1,1-dimethylbenzene)phenyl]-2H-benzotriazole (ultraviolet absorber) and bis(1,2,2,6,6-pentamethyl-4-piperidinyl) sebacate (photostabilizer) in a proportion of 100 parts by weight, 1 part by weight and 0.5 part by weight.

(D) A toluene solution containing the resin of the barrier coat (B), 1.5 parts by weight, based on 100 parts by weight of the solid of said resin, of 2-hydroxy-4-methoxybenzophenone (ultraviolet absorber) and 0.8 part by weight, based on 100 parts by weight of the solid of said resin, of pentaerythritol tetrabis[3-(3,5-di-t-butyl-4-hydroxyphenyl) propionate] (anti-oxidant).

(E) A solution containing (a) 100 parts by weight of a modified polyolefin resin obtained by mixing 100 parts by weight of the graft polymer of the barrier coat (A) with 10 parts by weight of a rosin and (b) 200 parts by weight of a mixed organic solvent consisting of 30% by weight of cellosolve acetate and 70% by weight of toluene. Static glass transition temperature: −52° C. Elongation at break at −20° C.: 700%.

(F) A solution comprising 100 part by weight of the graft polymer of the barrier coat (A), 1 part by weight of 2-[2-hydroxy-3,5-di(1,1-dimethylbenzyl)phenyl]-2H-benzotriazole (ultraviolet absorber), 0.5 part by weight of bis(1,2,2,6,6-pentamethyl-4-piperidinyl) sebacate (photostabilizer) and 200 parts by weight of a mixed solvent consisting of 10% by weight of carbinol acetate and 90% by weight of toluene.

(G) Same as (E) except that the mixed solvent of (E) has been changed to a mixed solvent consisting of 5% by weight of dimethyl phthalate and 95% by weight of toluene.

(H) A solution wherein 100 parts by weight of the graft polymer of the barrier coat (A) is dissolved in 200 parts by weight of a mixed solvent consisting of 20% by weight of isophorone and 80% by weight of toluene.

(I) A toluene solution of a resin obtained by graft-polymerizing a propylene-ethylene copolymer with maleic acid. Static glass transition temperature: +5° C.

(4) An intermediate coating paint: Amilac N-2 Sealer (an intermediate coating paint of amino polyester resin type manufactured by KANSAI PAINT CO., LTD)., pencil hardness at 20° C. H.

(5) Top coating paints (A) Amilac White (a top coating paint of amino alkyd resin type manufactured by KANSAI PAINT CO., LTD., a white paint for one coating and one baking) Pencil hardness at 20° C. H.

(B) Magicron Silver (a top coating paint of amino acryl resin type manufactured by KANSAI PAINT CO., LTD., a silver metallic paint for two coatings and one baking) Pencil hardness at 20° C.: H.

(C) Magicron Clear (a top coating paint of amino acryl resin type manufactured by KANSAI PAINT CO., LTD., a clear paint for two coatings and one baking) Pencil hardness at 20° C. H.

(D) Magicron Black (a top coating paint of amino acryl resin type manufactured by KANSAI PAINT CO., LTD.) Pencil hardness: 5H.

(E) Magicron Clear H (a top coating paint of amino acryl resin type manufactured by KANSAI PAINT CO., LTD., clear paint for two coatings and one baking) Pencil hardness: 5H.

(F) Radicure P Black (An electron rays-curing type paint using an acrylate polyester resin, manufactured by KANSAI PAINT CO., LTD) Pencil hardness: 6H. The coating film of this paint was cured by applying 6 Mrad of electron rays at 270 KeV.

(G) A white powder paint containing a glycidyl group-containing functional acryl resin and 2-dodecenoic acid. Pencil hardness: H.

(H) A clear powder paint containing a glycidyl group-containing functional acryl resin and 2-dodecenoic acid. Pencil hardness: H.

II. EXAMPLES AND COMPARATIVE EXAMPLES

Using the above samples, there were conducted applications to metallic substrates, of cation type electrocoating paints, barrier coats, intermediate coating paints and top coating paints according to procedures shown in Table 1.

TABLE 1

| | | Examples | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Metallic substrate | | | | | | | | | | | | | | | | | | | | | | | |
| Cation electro-coating | Paint | (A) | (A) | (A) | | (B) | | (B) | (B) | | (B) | (C) | | | (A) | | | | (A) | (B) | | | (B) |
| | | | | | | | | | | | | | | | (A) | | | | (A) | (B) | | | (B) |
| | Film thickness(μ) | | | | | | | | | | | | | | | | | | | | | | |
| | Flat portion | 20 | | | | | | | 20 | | 20 | 20 | | | 20 | | | | 20 | 20 | | | 20 |
| | Acute-angled portion | — | | | | | | | 4 | | 4 | 7 | | | — | | | | — | 4 | | | 4 |
| Barrier coating | Paint | (A) | | | | (B) | | (A) | (A) | (B) | (A)(B) | | | (A) | | (B) | (A) | | | | | (D) | (C) |
| Intermediate coating | | | | | | | | | | | | | | | | | | | | | | | | |
| Top coating | Coating system | 1C1B | 2C1B | | 1C1B | 2C1B | 1C1B | 2C1B | 1C1B | 2C1B | 2C1B | | 2C1B | 1C1B | 2C1B | 1C1B | 1C1B | 2C1B | 1C1B | 2C1B | | 2C1B | 2C1B |
| | Paint name | (A) | (B) | (G) | (A) | (B) | (A) | (B) | (G) | | (B) | | (D) | (F) | (D) | (F) | (A) | (B) | (A) | (B) | (D) | | (B) |
| | Film thickness (μ) | 35 | 15 | 50 | 35 | 15 | 35 | 15 | 50 | | 15 | | 15 | 35 | 15 | 35 | 35 | 15 | 35 | 15 | 15 | | 15 |
| | Paint name | | (C) | | | (C) | | (C) | | | (C) | | (E) | | (E) | | | (C) | | (C) | (E) | | (C) |
| | Film thickness (μ) | | 35 | | | 35 | | 35 | | | 35 | | 35 | | 35 | | | 35 | | 35 | 35 | | 35 |
| | Film curing | 140° C. · 30 min. | | 160° C. · 30 min. | | 140° C. · 30 min. | | | 160° C. · 30 min. | Baking conditions 140° C. · 30 min., Film thickness 20μ | 140° C. · 30 min. | | | | 140° C. · 30 min. | | | | 140° C. · 30 min. | | | | | 160° C. · 30 min. |

| | | Examples | | | | | | | | | | | Comparative Examples | | | | | | | | |
|---|---|---|---|---|---|---|---|---|---|---|---|---|---|---|---|---|---|---|---|---|---|
| | | 23 | 24 | 25 | 26 | 27 | 28 | 29 | 30 | 31 | 32 | 33 | 1 | 2 | 3 | 4 | 5 | 6 | 7 | 8 | 9 |
| Metallic substrate | | | | | | | | | | | | | | | | | | | | | |
| Cation electro-coating | Paint | (E) | (F) | (A) | (G) (H) | (A) | | (B) | (B) | (B) | (B) | (B) (C) | | | (A) | | | | | (B) (B) | |
| | | | | (A) | | | | (B) | | | | | | | (A) | | | | | | |
| | Film thickness(μ) | | | | | | | | | | | | | | | | | | | | | |
| | Flat portion | | | 20 | | | | 20 | 20 | 20 | 20 | 20 | | | 20 | | | | | 20 | |
| | Acute-angled portion | | | — | | | | 4 | 4 | 4 | 4 | 7 | Baking conditions 140° C. · 30 min. Film thickness 20μ | | — | | | | | 4 | |
| Barrier coating | Paint | (E) | (F) | | (G)(H) | (A) | | (A) | (B) | (B) | (A) | (B) | | | (A) | (I) | | | — | | (I) |
| Intermediate coating | | | | — | | | Baking conditions 140° C. · 30 min. Film thickness 20μ | | | | | | | | | | | | | | |
| Top coating | Coating system | 1C1B | 2C1B | | 1C1B | | 2C1B | 1C1B | 2C1B | 1C1B | 2C1B | 1C1B | 1C1B | 2C1B | 1C1B | 2C1B | 1C1B | 2C1B | 1C1B | | |
| | Paint name | (G) | (B) | | (G) | | (D) | (F) | (D) | (F) | (D) | (F) | (A) | (B) | (A) | (B) | (A) | (B) | (G) | (A) | (G) |
| | Film thickness (μ) | 35 | 15 | | 50 | | 15 | 35 | 15 | 35 | 15 | 35 | 35 | 15 | 35 | 15 | 35 | 15 | 50 | 35 | 50 |
| | Paint name | | (H) | | | | (E) | | (E) | | (E) | | | (C) | | (C) | | (C) | | | |
| | Film thickness (μ) | | 35 | | | | 35 | | 35 | | 35 | | | 35 | | 35 | | 35 | | | |
| | Film curing | 160° C. · 30 min. | | | | | 140° C. · 30 min. | | 140° C. · 30 min. | | 140° C. · 30 min. | | 140° C. · 30 min. | | 140° C. · 30 min. | | | | 160° C. · 30 min. | 140° C. · 30 min. | 160° C. · 30 min. |

TABLE 1-continued

| | | Comparative Examples | | | | | | | | | | | | | | | | | |
|---|---|---|---|---|---|---|---|---|---|---|---|---|---|---|---|---|---|---|---|
| | | 10 | 11 | 12 | 13 | 14 | 15 | 16 | 17 | 18 | 19 | 20 | 21 | 22 | 23 | 24 | 25 | 26 | 27 |
| Metallic substrate | | | | | | | | | | | | | | | | | | | |
| Cation electro-coating | Paint | (B) | (C) | Baking conditions 140°C · 30 min. Film thickness 20μ | | (A) | (A) | | | (B) | (B) | (A) | (A) | | (B) | Baking conditions 140°C · 30 min. Film thickness 20μ | | | (C) |
| | Film thickness(μ) Flat portion | 20 | | | | 20 | | | | 20 | | 20 | | | 20 | | | | 20 |
| | Acute-angled portion | 7 | | | | — | | | | 4 | | — | | | 4 | | | | 7 |
| Barrier coating | Paint | — | (I) | | — | (I) | | (I) | (I) | | | | (I) | | — | (I) | | — | (I) |
| Intermediate coating | | | | | | | | | | | | | | | | | | | |
| Top coating | Coating system | 2C1B | | 2C1B | 1C1B | 2C1B | 1C1B | | 2C1B | 1C1B | 1C1B | 2C1B | 1C1B | 2C1B | 1C1B | 2C1B | | 1C1B | 2C1B |
| | Paint name | (B) | | (D) | (F) | (D) | (A) | | (B) | (B) | (G) | (B) | (G) | (D) | (F) | (D) | | (E) | (D) |
| | Film thickness (μ) | 15 | | 15 | 35 | 15 | 35 | | 15 | 15 | 50 | 15 | 50 | 15 | 35 | 15 | | 35 | 15 |
| | Paint name | (C) | | (E) | | (E) | | | (C) | | | (H) | | (E) | | (E) | | | (E) |
| | Film thickness (μ) | 35 | | 35 | | 35 | | | 35 | | | 35 | | 35 | | 35 | | | 35 |
| | Film curing | 140°C · 30 min. | | | | 140°C · 30 min. | | | | | | 160°C · 30 min. | | 140°C · 30 min. | | 140°C · 30 min. | | | 140°C · 30 min. |

In Table 1, the conditions of cation electrodeposition were as follows: Solid content in bath: 20% by weight, bath temperature: 28° C., pH: 6.5, load voltage: about 250 V, electrification: about 180 sec. After electrocoating, water washing was conducted and then baking was conducted at 170° C. for 30 min. All film thicknesses are thicknesses after curing.

The barrier coats were applied using in air spray machine. All film thickness were 6 to 10μ after drying at flat portions.

The intermediate coating paints and the top coating paints were spray-coated using an electrostatic coating equipment.

In the top coating, "1C1B" refers to a coating system wherein a color paint is applied and then baked at 160° C. for 30 min. "2C1B" refers to a coating system wherein a metallic paint and a clear paint are applied in this order or a wet-on-wet basis and then the resulting two films are simultaneously baked at 160° C. for 30 min. All film thicknesses are for flat portions.

III. Results of Performance Tests

The coated panels obtained in the above Examples and Comparative Examples were used as test panels and subjected to performance tests. The results are shown in Table 2 which appears later.

[Test items and test methods]

1. Chipping resistance*
(1) Gravel impact testing machine: Q-G-R Gravelometer manufactured by Q Panel Co.
(2) Stones to be blown: Crushed stones having diameters of about 15 to 20 mm.
(3) Volume of stones to be blown: About 500 ml.
(4) Blowing air pressure: About 4 kg/cm$^2$.
(5) Test temperature: About 20° C.

*A test panel was fixed to a support panel. About 500 ml of crushed stones were allowed to hit the test panel using a blowing air pressure of about 4 kg/cm$^2$. Thereafter the test panel was tested for film surface condition and salt water spray resistance. Film surface condition was examined visually and evaluated based on the criteria given below. In the test of salt water spray resistance, a test panel after having been hit by the crushed stones was subjected to a salt water spray test by JIS Z 2371 for 480 hrs.; then, an adhesive cellophane tape was stuck on the film surface of the test panel and rapidly peeled off; and the state of subsequent rust development, condition of corrosion, peeling of coating film, etc. at the hit portions were observed.

Evaluation criteria (1) Film surface condition
⊚: Cracking by hitting is recognizable very slightly at the limited places of a top coating film. There is no peeling of an electrocoating film.
◯: Cracking by hitting is recognizable in places of a top coating film and peeling of the electrocoating film is seen at less numbers of places.
Δ: Top coating peeled off at many places and peeling of electrocoated film occured at a minor degree.
X: The greatest part of the top coating film peels off. An electrocoating film peels off at the hit portions and their surrounding areas.

(2) Salt water spray resistance
⊚: Rust development, corrosion, film peeling, etc. are not observed.
◯: Rust, corrosion and film peeling are slight.
Δ: Rust, corrosion and film peeling are a little severe.
X: Rust, corrosion and film peeling are very severe.

Chipping resistance after acceleration exposure was tested in accordance with the above method after the coated panel has been exposed for 2,000 hrs. in a sunshine weatherometer (WEL-SUN-HC Model manufactured by Suga Shikenki K.K.).

2. Impact resistance
This test was conducted in an atmosphere of 0° C. in accordance with JIS K 5400-1979 6.133B. A weight of 500 g was dropped from a height of 50 cm to examine the damage incurred on the coating film.
⊚: No change.
Δ: Slight appearance of cracks and peeling.
X: Severe cracks and peeling.

3. Adhesion
The coating film of a test panel was formed into 100 squares each of 1 mm×1 mm in accordance with JIS K 5400-1979 6.15. Thereon was stuck an adhesive cellophane tape. The tape was subjected to rapid peeling and the number of remaining squares was counted.

Adhesion after acceleration exposure was tested in accordance with the above method after test panel has been exposed for 2,000 hrs. in a sunshine weatherometer (WEL-SUN-HC manufactured by the Suga Shikenki K.K.).

4. Water resistance
A test panel was immersed in water of 40° C. for 10 days and the film surface was evaluated.
⊚: No change.

5 Smoothness
A test panel was visually examined for the formation of unevennesses on the film surface.
⊚: Almost none.
Δ: A small number of unevennesses.
X: A large number of unevennesses.

6. Corrosion resistance at acute-angled portion
A test panel was subjected to the same salt water spray test as in 1. Chipping resistance for 480 hrs. The condition of film surface at the acute-angled portion was examined visually.
⊚: No rust development.
Δ: Slight rusting.
X: Severe rusting.

7. Filiform corrosion resistance
In the coating film of a test panel two lines were cut diagonally with a cutter down to the substrate of the panel. Then the test panel was placed in a salt water spray tester of JIS Z 2371 for 48 hrs., after which the film surface was washed with deionized water. Then, the test panel was placed in a constant temperature and constant humidity box (temperature: 40°±2° C., R.H.: 85±2%) for 480 hrs. and the extent of filiform corrosion on the test panel was examined. An average length and density of filiform corrosion were recorded.

Evaluation criteria

F: 2 to 3 or less filiform corrosions within each 10 mm portion of cut lines
M: around 5 to 6 filiform corrosions within each 10 mm portion of cut lines
D: 10 or more filiform corrosions within each 10 mm portion of cut lines 8. Scab corrosion resistance
A test panel was immersed in warm water of 40° C. for 120 hrs. and then dried for 4 hrs. at 20° C. The resulting test panel was subjected to chipping using 300 g of No. 6 crushed stones at 4 kg/cm$^2$ and also to straight line cutting. Then, the panel was subected to repetition of a unit test [immersion in 5% aqueous NaCl solution at 30° C. for 2 hr.→standing at −20° C. for 1 hr.→standing outdoors for 45 hrs.]. This unit test was con ducted 3 times per week as one cycle. After 10 cycles, there was examined the film surface condition (particularly, rust, swelling, etc.)

◎ : No distinct change.

Δ: Slight rust and swelling.

X: Severe rust and swelling.

9. Pencil hardness

The hardness of the hardest pencil which gives no scratch at 20° C.

10. Scuff resistance

On a test panel held horizontally were laid 4 sheets of victoria lawns at 20° C. Thereon was placed a weight of 1 kg (for use in even balances and having a flat bottom of 5 cm in diameter). By holding the ends of the victoria lawns and pulling them, the victoria lawns and the weight were moved on the panel reciprocately 20 times at a speed of 20 cm/sec. Then, the film surface condition was evaluated.

◎ : Substantially free from scuff.

Δ: Slight scuff.

X: Severe scuff.

TABLE 2

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Chipping Initial resistance | Film surface condition | ◎ | ◎ | ◎ | ◎ | ◎ | ◎ | ◎ | ◎ | ◎ | ◎ | ◎ |
| | Salt water spray resistance | ◎ | ◎ | ◎ | ◎ | ◎ | ◎ | ◎ | ◎ | ◎ | ◎ | ◎ |
| After acceleration exposure | Film surface condition | — | — | — | — | — | — | — | — | — | — | — |
| | Salt water spray resistance | — | — | — | — | — | — | — | — | — | — | — |
| Impact resistance | | ◎ | ◎ | ◎ | ◎ | ◎ | ◎ | ◎ | ◎ | ◎ | ◎ | ◎ |
| Adhesion | | 100 | 100 | 100 | 100 | 100 | 100 | 100 | 100 | 100 | 100 | 100 |
| Adhesion after acceleration exposure | | — | — | — | — | — | — | — | — | — | — | — |
| Water resistance | | ◎ | ◎ | ◎ | ◎ | ◎ | ◎ | ◎ | ◎ | ◎ | ◎ | ◎ |
| Smoothness | | ◎ | — | ◎ | ◎ | — | ◎ | ◎ | ◎ | ◎ | ◎ | ◎ |
| Corrosion resistance at acute-angled portion | | — | — | — | — | — | ◎ | ◎ | ◎ | ◎ | ◎ | ◎ |
| Linear rust resistance | | — | — | — | — | — | F | F | F | F | F | F |
| Scab corrosion resistance | | — | — | — | — | — | ◎ | ◎ | ◎ | ◎ | ◎ | — |
| Pencil hardness | | H | H | H | H | H | H | H | H | H | H | H |
| Scuff resistance | | — | — | — | — | — | — | — | — | — | — | — |

| | | Examples | | | | | | | | | | | |
|---|---|---|---|---|---|---|---|---|---|---|---|---|---|
| | | 12 | 13 | 14 | 15 | 16 | 17 | 18 | 19 | 20 | 21 | 22 | 23 |
| Chipping Initial resistance | Film surface condition | ◎ | ◎ | ◎ | ◎ | ◎ | ◎ | ◎ | ◎ | ◎ | ◎ | ◎ | ◎ |
| | Salt water spray resistance | ◎ | ◎ | ◎ | ◎ | ◎ | ◎ | ◎ | ◎ | ◎ | ◎ | ◎ | ◎ |
| After acceleration exposure | Film surface condition | — | — | ◎ | ◎ | ◎ | △ | ◎ | ◎ | ◎ | ◎ | ◎ | ◎ |
| | Salt water spray resistance | — | — | ◎ | ◎ | ◎ | ○ | ◎ | ◎ | ◎ | ◎ | ◎ | ◎ |
| Impact resistance | | ◎ | ◎ | ◎ | ◎ | ◎ | ◎ | ◎ | ◎ | ◎ | ◎ | ◎ | ◎ |
| Adhesion | | 100 | 100 | 100 | 100 | 100 | 100 | 100 | 100 | 100 | 100 | 100 | 100 |
| Adhesion after acceleration exposure | | — | — | — | — | 100 | 90 | 100 | 100 | 100 | 100 | 100 | 100 |
| Water resistance | | ◎ | ◎ | ◎ | ◎ | ◎ | ◎ | ◎ | ◎ | ◎ | ◎ | ◎ | ◎ |
| Smoothness | | ◎ | — | ◎ | ◎ | ◎ | ◎ | — | ◎ | ◎ | ◎ | ◎ | ◎ |
| Corrosion resistance at acute-angled portion | | — | — | — | — | — | — | — | — | — | — | ◎ | — |
| Linear rust resistance | | — | — | — | — | — | — | — | — | — | — | F | — |
| Scab corrosion resistance | | — | — | — | — | — | — | — | — | — | — | ◎ | — |
| Pencil hardness | | 5H | 6H | 5H | 6H | H | H | H | H | H | H | H | H |
| Scuff resistance | | — | — | — | — | — | — | — | — | — | — | — | — |

| | | Examples | | | | | | | | | | |
|---|---|---|---|---|---|---|---|---|---|---|---|---|
| | | 24 | 25 | 26 | 27 | 28 | 29 | 30 | 31 | 32 | 33 | |
| Chipping Initial resistance | Film surface condition | ◎ | ◎ | ◎ | ◎ | ◎ | ◎ | ◎ | ◎ | ◎ | ◎ | |
| | Salt water spray resistance | ◎ | ◎ | ◎ | ◎ | ◎ | ◎ | ◎ | ◎ | ◎ | ◎ | |
| After acceleration exposure | Film surface condition | ◎ | ◎ | ◎ | ◎ | ◎ | ◎ | ◎ | ◎ | ◎ | ◎ | |
| | Salt water spray resistance | ◎ | ◎ | ◎ | ◎ | ◎ | ◎ | ◎ | ◎ | ◎ | ◎ | |
| Impact resistance | | ◎ | ◎ | ◎ | ◎ | ◎ | ◎ | ◎ | ◎ | ◎ | ◎ | |
| Adhesion | | 100 | 100 | 100 | 100 | 100 | 100 | 100 | 100 | 100 | 100 | |
| Adhesion after acceleration exposure | | 100 | 100 | 100 | 100 | — | — | — | — | — | — | |
| Water resistance | | ◎ | ◎ | ◎ | ◎ | ◎ | ◎ | ◎ | ◎ | ◎ | ◎ | |
| Smoothness | | △ | — | — | △ | ◎ | ◎ | ◎ | ◎ | ◎ | — | |
| Corrosion resistance at acute-angled portion | | — | — | — | — | F | F | F | F | F | F | |
| Linear rust resistance | | — | — | — | — | F | F | F | F | F | F | |
| Scab corrosion resistance | | — | — | — | — | ◎ | ◎ | ◎ | ◎ | ◎ | F | |

| | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Chipping Initial resistance | Film surface condition | X | X | X | △ | X | X | X | △ | △ | X | △ | X | X |
| | Salt water spray resistance | X | X | X | △ | X | X | X | △ | △ | X | △ | X | X |
| After acceleration exposure | Film surface condition | — | — | — | △ | — | — | — | — | — | — | — | — | — |
| | Salt water spray resistance | — | — | — | 100 | — | — | — | — | — | — | — | — | — |
| Impact resistance | | ◎ | ◎ | ◎ | ◎ | ◎ | ◎ | ◎ | ◎ | ◎ | ◎ | ◎ | ◎ | ◎ |
| Adhesion | | 100 | — | — | — | — | — | — | — | — | — | — | — | — |
| Adhesion after acceleration exposure | | — | — | — | — | — | — | — | — | — | — | — | — | — |
| Water resistance | | X | X | ◎ | △ | ◎ | ◎ | ◎ | ◎ | ◎ | X | ◎ | X | ◎ |
| Smoothness | | 100 | 100 | — | 100 | 100 | 100 | 100 | 100 | 100 | 100 | 100 | 100 | 100 |
| Corrosion resistance at acute-angled portion | | X | X | — | — | X | X | X | △ | △ | X | X | — | — |
| Linear rust resistance | | D | — | — | — | D | D | D | M | M | D | D | — | — |
| Scab corrosion resistance | | X | — | — | — | X | X | X | X | X | X | X | — | — |

| | | | | | | | | | |
|---|---|---|---|---|---|---|---|---|---|
| resistance | | | | | | | | | |
| Pencil hardness | H | H | 5H | 6H | 5H | 6H | H | H | H |
| Scuff resistance | — | — | | | | | — | — | — |

TABLE 2-continued

| | | | Comparative Examples | | | | | | | | | | | | | |
|---|---|---|---|---|---|---|---|---|---|---|---|---|---|---|---|---|
| | | | 14 | 15 | 16 | 17 | 18 | 19 | 20 | 21 | 22 | 23 | 24 | 25 | 26 | 27 |
| Chipping resistance | Initial | Film surface condition | △ | X | X | X | X | X | X | △ | X | X | △ | X | X | △ |
| | | Salt water spray resistance | △ | X | X | X | X | X | X | △ | X | X | △ | X | X | △ |
| | After acceleration exposure | Film surface condition | — | X | X | X | X | X | X | X | — | — | — | — | — | — |
| | | Salt water spray resistance | — | X | X | X | X | X | X | X | — | — | — | — | — | — |
| Impact resistance | | | X 100 | X 100 | X 100 | △ 100 | X 100 | X 100 | X 100 | △ 100 | X 100 | X 100 | △ 100 | X 100 | X 100 | △ 100 |
| Adhesion | | | — | 50 | 50 | 50 | 50 | 50 | 50 | 50 | — | — | — | — | — | — |
| Adhesion after acceleration exposure | | | ⊚ | ⊚ | ⊚ | ⊚ | ⊚ | ⊚ | ⊚ | ⊚ | ⊚ | ⊚ | ⊚ | ⊚ | ⊚ | ⊚ |
| Water resistance | | | ⊚ | ⊚ | ⊚ | ⊚ | ⊚ | △ | △ | △ | X | X | △ | X | X | △ |
| Smoothness | | | — | — | — | — | X | — | — | — | X | X | — | X | X | — |
| Corrosion resistance at acute-angled portion | | | — | — | — | — | D | — | — | — | D | D | D | D | D | D |
| Linear rust resistance | | | — | — | — | — | X | — | — | — | X | X | X | X | X | X |
| Scab corrosion resistance | | | 5H | — | — | — | H | H | H | H | 5H | 6H | 5H | 6H | 5H | 6H |
| Pencil hardness | | | ⊚ | — | — | — | — | — | — | — | — | — | — | — | — | — |
| Scuff resistance | | | | | | | | | | | | | | | | |

What we claim is:

1. A process for coating a metallic substrate, characterized by applying on a metallic substrate a cationic electrodeposition paint, applying thereon a barrier coat comprising a modified polyolefin resin and capable of forming a barrier coat film having a static glass transition temperature of 0° to −60° C. and then applying thereon a top coating paint said modified polyolefin resin being selected from the group consisting of (i) resins obtained by graft-polymerizing maleic acid or maleic anhydride onto base polyolefin resins, (ii) resins obtained by graft-polymerizing acrylic acid or methacrylic acid onto chlorinated products of base polyolefin resins, (iii) copolymers between (a) at least one member selected form ethylenic hydrocarbons and (b) at least one comonomer selected from vinyl acetate, acrylic acid and methacrylic acid, (iv) compositions obtained by adding 1 to 90 parts by weight of chlorinated polyolefins to 100 parts by weight of base polyolefins, (v) compositions obtained by adding 1 to 90 parts by weight of acrylic resins having a static glass transition temperature of 0° or lower and a number average molecular weight of 5,000 to 100,000 to 100 parts by weight of base polyolefin resins, and (vi) compositions obtained by adding 1 to 90 parts by weight of a styrene-butadiene copolymer to 100 parts by weight of base polyolefin resins.

2. A process according to claim 1, wherein the cationic electrodeposition paint is a thermosetting cathodic deposition paint obtained by neutralizing a base resin having basic amino groups with an acid and dissolving or dispersing the reuslting resin in water.

3. A process according to claim 1, herein the cationic electrodeposition paint contains 35 parts by weight or less of pigments based on 100 parts by weight of resin solid.

4. A process according to claim 1, wherein the cationic electrodeposition paint contains 40 to 150 parts by weight of pigments based on 100 parts by weight of resin solid.

5. A process according to claim 1, wherein the film formed by the barrier coat has a static glass transition temperature of −30° to −60° C.

6. A proces according to claim 5, wherein the static glass transition temperature is −40° to −55° C.

7. A process according to claim 1, wherein the modified polyolefin resin is obtained by graft-polymerizing a polyolefin resin with maleic acid or maleic anhydride.

8. A process according to claim 7, wherein the modified polyolefin resin is obtained by graft-polymerizing 100 parts by weight of a propylene-ethylene copolymer having a propylene: ethylene mole ratio of 40:60 to 80:20 with 0.1 to 50 parts by weight of maleic acid or maleic anhydride.

9. A process according to claim 1, wherein the modified polyolefin resin is a blend of 100 parts by weight of a polyolefin resin and 1 to 90 parts by weight of a chlorinated polyolefin resin having a chlorination degree of 1 to 60% and having a number average molecular weight of 10,000 to 1,000,000.

10. A process according to claim 9, wherein the polyolefin resin is a propylene-ethylene copolymer having a propylene:ethylene mole ratio of 40:60 to 80:20 and the chlorinated polyolefin is a chlorinated polypropylene.

11. A process according to claim 1, wherein the film formed by the barrier coat has an elongation at break of 200 to 1,000% in an atmosphere of −20° C.

12. A process according to claim 11, wherein the elongation at break is 300 to 800% in an atmosphere of −20° C.

13. A process according to claim 1, wherein the barrier coat is an organic solvent-base paint.

14. A process according to claim 1, wherein the film formed by the barrier coat is 1 to 20μ in terms of thickness of dried film.

15. A process according to claim 1, wherein an intermediate coating paint is applied to the barrier coat prior to application of the top coat.

16. A process according to claim 15, wherein the intermediate coating paint is a thermosetting intermediate coating paint of organic solvent-base or water-base paint containing, as a vehicle main component, a combination of (1) a short oil or ultra-short oil alkyd resin having an oil length of 30% or less and/or an oil-free polyester resin and (2) an amino resin.

17. A process according to claim 15, wherein the film formed by the intermediate coating paint has a pencil hardness of 3B to 6H at 20° C.

18. A process according to claim 15, wherein the film formed by the intermediate coating film has a thickness of 10 to 100μ in terms of thickness of cured film.

19. A process according to claim 1, wherein the top coating paint is a top coating paint of an alkyl-etherified amino resin/acrylic resin or an alkyl-etherified amino resin/alkyd resin.

20. A process according to claim 1, wherein the top coating paint is a paint capble of forming an ultra-hard coating film.

21. A process according to claim 20, wherein the ultra-hard coating film has a pencil hardness of 4H to 9H at 20° C. in terms of hardness of cured film.

22. A process according to claim 4 in which the cationic electrodeposition pain contains 55 to 100 parts by weight of pigments based on 100 parts by weight of resin solid.

23. A process according to claim 22, wherein the top coating paint is in powder form.

24. A process according to claim 23, wherein the barrier coat contains a compatible solvent.

25. A process according to claim 22, wherein the barrier coat contains at least one deterioration inhibitor for resins, selected from ultraviolet absorbers, photostabilizers and anti-oxidants.

26. A metallic substrate coated according to the process of claim 1.

* * * * *